United States Patent [19]

Sengoku

[11] Patent Number: 4,937,687

[45] Date of Patent: Jun. 26, 1990

[54] MEMORY UNIT CAPABLE OF DETECTING ERROR IN REGENERATED DATA FROM A MEMORY MEDIUM

[75] Inventor: Masaharu Sengoku, Hyogo, Japan

[73] Assignee: Mitsubishi Denki Kabushiki Kaisha, Tokyo, Japan

[21] Appl. No.: 310,509

[22] Filed: Feb. 15, 1989

Related U.S. Application Data

[63] Continuation of Ser. No. 927,090, Nov. 5, 1986, abandoned.

[30] Foreign Application Priority Data

Jan. 28, 1986 [JP] Japan .................................. 61-16371

[51] Int. Cl.⁵ .................................................. G11B 5/09
[52] U.S. Cl. ...................................................... 360/51
[58] Field of Search ........................ 360/39, 51, 53, 54

[56] References Cited

U.S. PATENT DOCUMENTS

| | | | |
|---|---|---|---|
| 4,141,046 | 2/1979 | Brown | 360/51 |
| 4,191,976 | 3/1980 | Braun | 360/51 |
| 4,417,286 | 11/1983 | Anderson | 360/51 |
| 4,472,818 | 9/1984 | Zapisek et al. | 360/51 |
| 4,580,278 | 4/1986 | Yamamoto | 360/51 |
| 4,638,472 | 1/1987 | Ogata et al. | 360/53 |
| 4,737,866 | 4/1989 | Ebata | 360/51 |
| 4,811,125 | 3/1989 | Sengoku | 360/51 |

FOREIGN PATENT DOCUMENTS 60-101777 6/1985 Japan .

Primary Examiner—Vincent P. Canney
Attorney, Agent, or Firm—Bernard, Rothwell & Brown

[57] ABSTRACT

A memory unit adapted for use with an electronic computer or the like. In the unit, a data-clock pulse train regenerated by a head is discriminated into a data pulse train and a clock pulse train by a discrimination circuit in accordance with a phase-variable gate signal outputted from a gate circuit, and any error in each of such discriminated pulse trains is detected by a regeneration error detection circuit. Meanwhile, when a discrimination phase margin of the gate signal outputted from the gate circuit has become narrower than a predetermined value, such state is detected by a phase margin detection circuit, so that any regeneration error in the data-clock pulse train can be detected with a high precision.

4 Claims, 4 Drawing Sheets

MEMORY UNIT CAPABLE OF DETECTING ERROR IN REGENERATED DATA FROM A MEMORY MEDIUM

This is a continuation-in-part of application Ser. No. 927,090, filed Nov. 5, 1986, now abandoned.

BACKGROUND OF THE INVENTION

The present invention relates to a memory unit for use in an electronic computer and peripheral or terminal equipment thereof.

1. Description of the Prior Art

Generally in an electronic computer or similar apparatus for processing certain data in accordance with a prepared program, it is usual to employ memory units adapted to store and regenerate, when necessary, incorporated program, data inputted to the apparatus, the result of computation and so forth. Such memory units are classified into a variety of types by some fundamentals concerning an internal type or an external type with respect to installation for the computer, capability of reading out or rewriting the data stored, the kind of a recording medium used, and a storage system such as magnetic, electric, chemical or mechanical.

As an example of such various memory units, there is known a magnetic disc device disclosed in Japanese Patent Laid-open No. 60-101777. This magnetic disc device functioning as a conventional memory unit comprises, as shown in FIG. 1, a plate-shaped support base 1, a spindle motor 2 mounted as a rotator on the base 1, a disc 3 set on the spindle motor 2 to serve as a recording medium, a head 4 for reading out data from the disc 3 or writing data thereon while being kept in or out of contact with the storage surface of the disc 3, an arm 5 to which the head 4 is attached via a pressure spring 6 joined to the fore end of the arm, a support mechanism 7 for holding the arm 5 firmly on a driving mechanism (not shown) or a stationary mechanism (not shown), and a cover 8 attached to the base 1 to enclose the above-mentioned members.

The configuration of a recording/regenerating circuit means in the magnetic disc device of such entire constitution will now be described below with reference to a block connection diagram of FIG. 2. In the figure, there are shown a flip-flop circuit 9 responsive to a data-clock pulse train a inputted thereto and inverting an output b from a positive (or negative) logic to a negative (or positive) logic by the rise of such data-clock pulse train a; a current control circuit 10 for converting the output b of the flip-flop circuit 9 into a current c and applying the same as a recording current to the head 4; a regeneration amplifying circuit 11 for amplifying the regenerated output d of the head 4 and feeding an output e to a peak detection circuit 12, which inverts an output f from a positive (or negative) logic to a negative (or positive) logic at the peak of the output e of the regeneration amplifying circuit 11; and a one-shot circuit 13 responsive to the output f of the peak detection circuit 12 and triggered by the rise or fall of the output f to feed a positive logic output g to a voltage-controlled variable frequency oscillation circuit (hereinafter referred to as VFO circuit) 14 and AND circuits 15 and 16 merely during a preset time. The VFO circuit 14 receives the output g of the one-shot circuit 13 and oscillates synchronously with the mean phase of the output g within a predetermined time, and the oscillation frequency of the VFO circuit 14 is controlled by a voltage obtained through conversion of the phase difference between the output of the VFO circuit and the output g, in such a manner that the above phase difference is reduced to zero. The output g of one-shot circuit 13 is delayed for a predetermined time, and complementary outputs h and i of VFO circuit 14 are fed to AND circuits 15 and 16 only during a predetermined period of time. In response to the output g of one-shot circuit 13 and the complementary outputs h and i of VFO circuit 14, AND circuits 15 and 16 produce AND outputs j and k respectively. There is further shown a regeneration error detection circuit 17 which receives the logical product outputs j and k of AND circuits 15, 16 and produces an output l after detecting any regeneration error.

FIG. 3 is a waveform chart of signals in the individual circuits of FIG. 2, wherein x and y denote times of clock and data pulses respectively, and t denotes a delay time from the output g to the output h.

Referring now to the operation, when the disc 3 is rotated with the spindle motor 2 driven, a floating force is exerted on the head 4 due to a viscous air stream generated on the surface of the disc 3. Such floating force balances with the pressure of the spring 6 applied to the head 4, so that the disc 3 is rotated while a minute space is maintained between the disc 3 and the head 4. When a train of data and clock pulses x, y and a recording instruction are transmitted from the electronic computer to the magnetic disc device in the state mentioned above, a recording current c is caused to flow in the head 4 by the flip-flop circuit 9 and the current control circuit 10, whereby the data is recorded on the disc 3.

Meanwhile, when a regeneration instruction is transmitted from the electronic computer to the magnetic disc device, the regenerated output d of the head 4 is amplified by the regeneration amplifying circuit 11 and, after the peak is detected by the peak detection circuit 12, the train of clock-data pulses x, y recorded on the disc 3 is restored by the one-shot circuit 13. The AND circuits 15 and 16 produce logical product outputs j, k from the train of data-clock pulses x, y or the output g of one-shot circuit 13 and the complementary outputs h, i of VFO circuit 14, and discriminate between a data pulse train y and a clock pulse train x. The logical product output of signals g and h transmitted to AND circuit 15 is signal j which conducts data. The logical product of signals g and i transmitted to AND circuit 16 is signal k which provides clock pulses. During regeneration of the data in the magnetic disc device, the regeneration error detection circuit 17 detects any error in the regenerated data and sends a detection signal l to the electronic computer, which then keeps transmitting an instruction to repeat such regeneration until elimination of the error, thereby obtaining correct data.

However, there exist the following problems in the conventional magnetic disc device of the above-described structure.

Firstly, dust in the magnetic disc device is prone to enter a minute gap between the head and the disc and, when any external great vibration or shock is applied to the disc device, the floating state of the head with respect to the disc is rendered unstable so that the head is finally brought into contact with the disc, whereby the contact surfaces of both the head and the disc are damaged to eventually cause deterioration of the performance or faults in the magnetic disc device.

Furthermore, in relation to the above problem as well, it may happen that the head falls on the disc to induce trouble in case the damaged head is used for a long time, and the data stored on the disc is thereby spoiled. As a result, the work being executed by utilizing the electronic computer and so forth is brought to a halt to consequently bring about operational and economic loss in business.

SUMMARY OF THE INVENTION

It is an object of the present invention to provide an improved memory unit which is capable of detecting any error in the regenerated data from a memory medium to previously sense any fault based on entrance of dust or other causes, thereby preventing deterioration of the performance or occurrence of such fault.

And another object of the invention resides in providing an improved memory unit which detects any error in the regenerated data from a memory medium to prevent erasure of the stored data, hence averting interruption of work or operational and economic loss that may otherwise be induced in business due to faults.

In order to achieve the above mentioned objects, the memory unit according to the present invention is equipped with a gate circuit for producing a phase-variable gate signal, a discrimination circuit for discriminating a data-clock pulse train into a data pulse train and a clock pulse train in accordance with the phase-variable gate signal, a regeneration error detection circuit for detecting any error in each train of the data pulse and the clock pulse, and a phase margin detection circuit for detecting that the discrimination phase margin of the gate signal has become narrower than a predetermined value.

The phase margin is defined here as a time interval between a rising edge of a pulse g occurring between pulses of the output h, and the rising edge of an adjacent pulse h.

The phase margin is detected as being narrower than a predetermined value when this time interval either exceeds or is less than the fixed delay time t, by a specified amount.

DETAILED DESCRIPTION OF THE PREFERRED EMBODIMENTS

Figure 1:
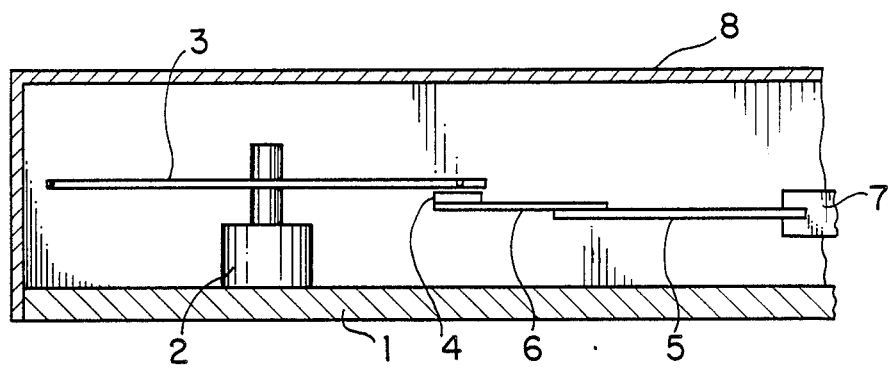
FIG. 1 is a partially sectional schematic view of an exemplary disc device serving as a memory unit.
Figure 2:
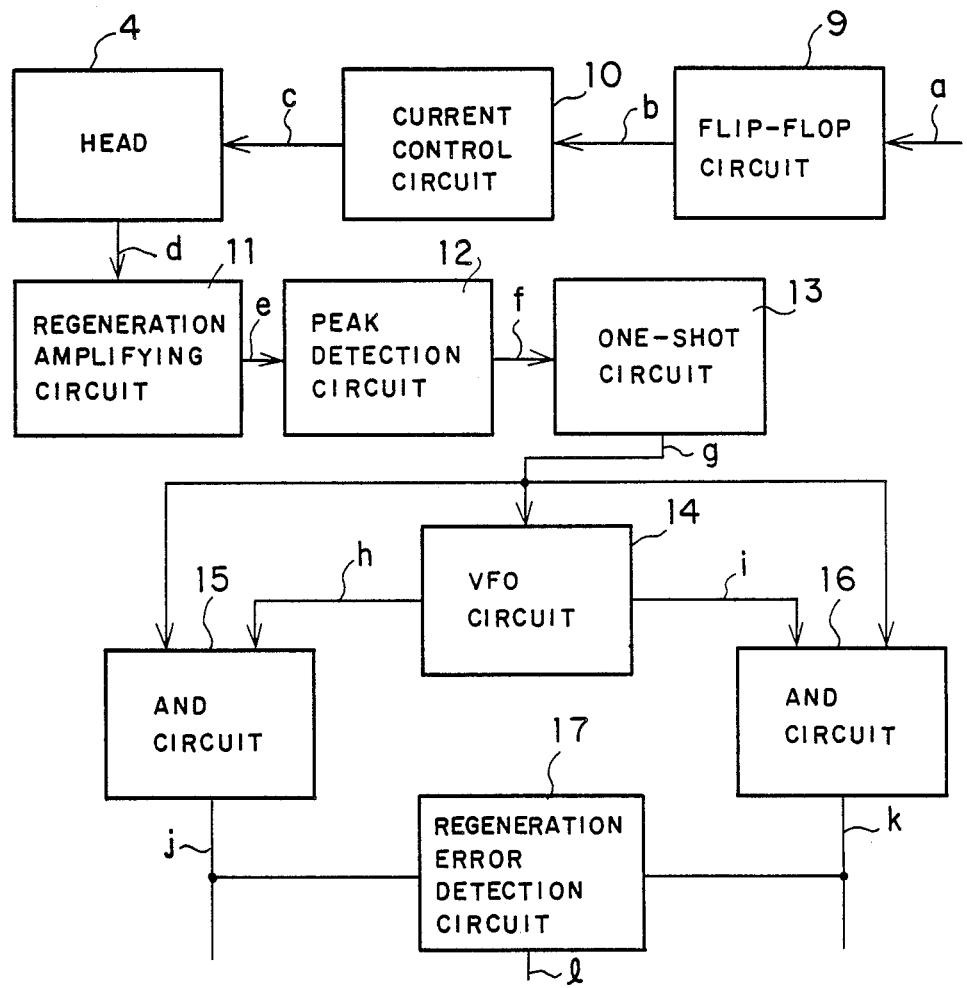
FIG. 2 is a block connection diagram schematically showing the constitution of a recording/regenerating circuit means in a conventional memory unit.
Figure 4:
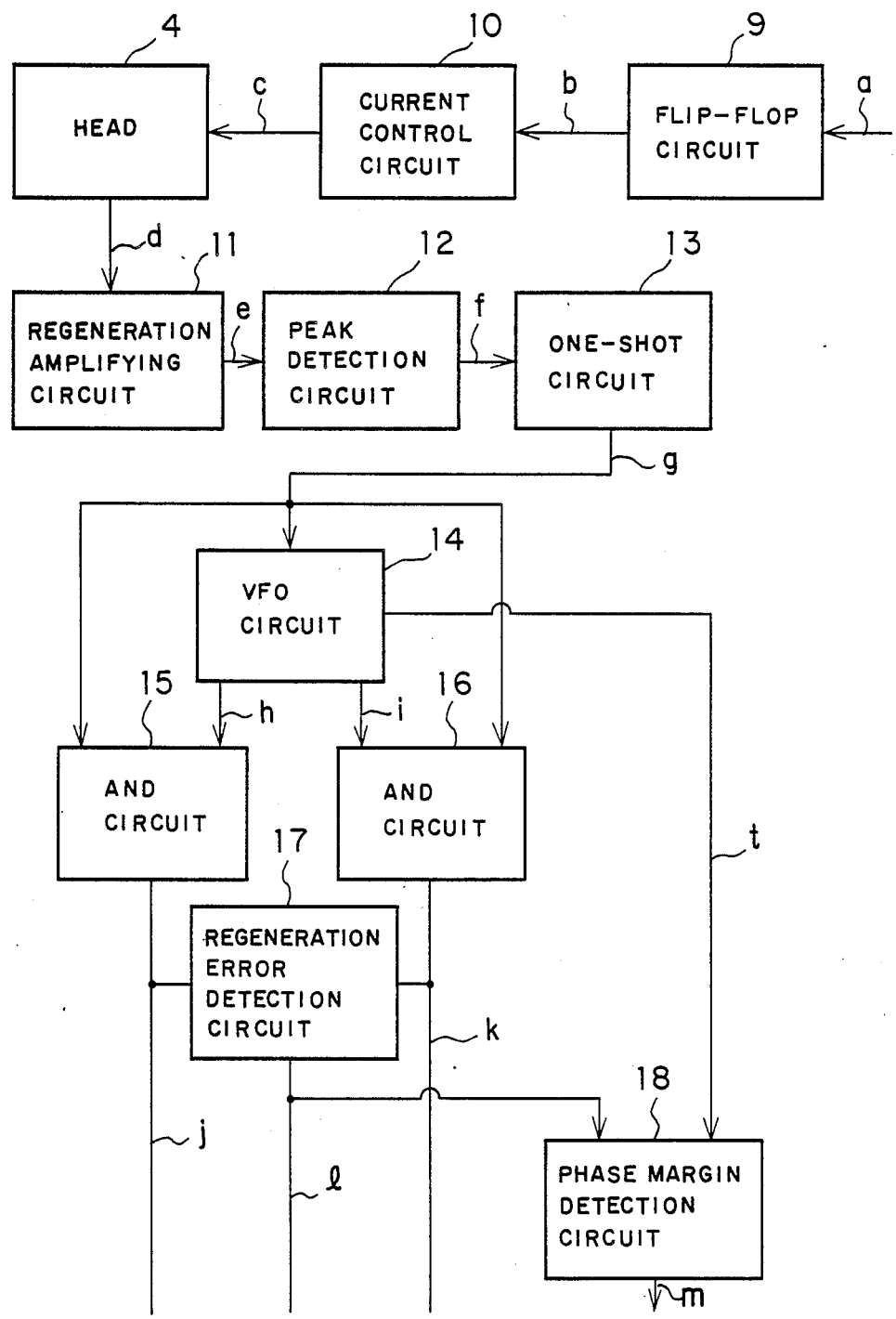
FIG. 4 is a block connection diagram schematically showing the constitution of a recording/regenerating circuit means in the memory unit of the present invention; and, FIGS. 5a, bc, de and f through m is a timing chart showing waveforms of output signals obtained from individual circuits of the circuit means in FIG. 4.

Hereinafter a preferred embodiment of a memory unit according to the present invention will be described in detail with reference to the accompanying drawings FIG. 4 is a block connection diagram of an example where the invention is applied to a recording-/regenerating circuit means in a disc device, wherein component elements denoted by reference numerals 4 and 9 through 17 correspond to those designated by the same numerals in FIG. 2, and a repeated explanation thereof is omitted here.

In FIG. 4, denoted by 18 is a phase margin detection circuit which receives both a delay time t of a complementary output h of a VFO circuit 14 from an output g of a one-shot circuit 13 and an output l of a regeneration error detection circuit 17, and produces an output m when the discrimination phase margin becomes narrower than a predetermined value. Phases of output signals h and i from the VFO circuit are delayed from signal g at a delay interval of time t.

Figure 3:
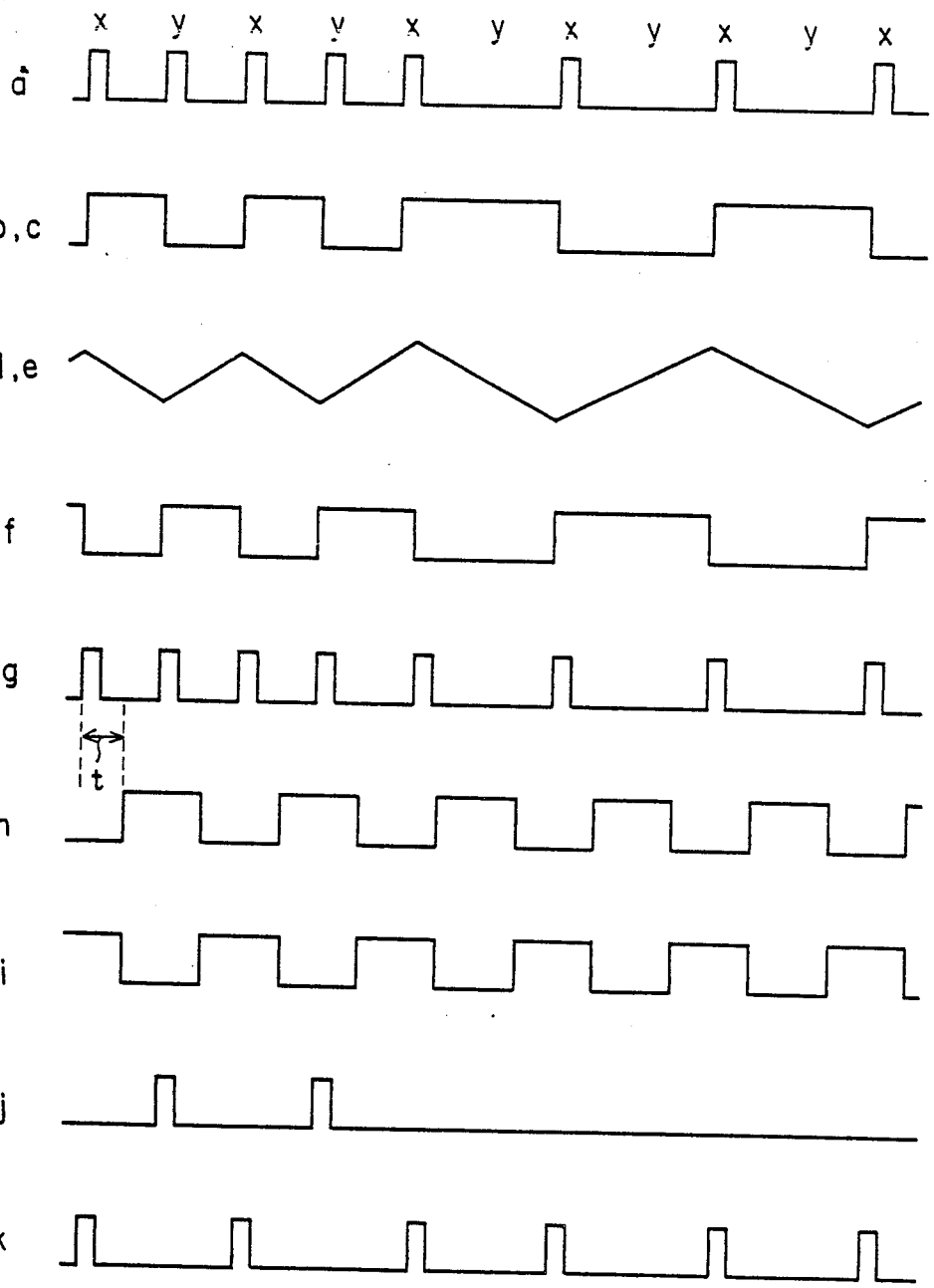
FIGS. 3a, bc, de and f through k is a timing chart showing waveforms of output signals obtained from individual circuits of the circuit means in FIG. 2.
Figure 5:
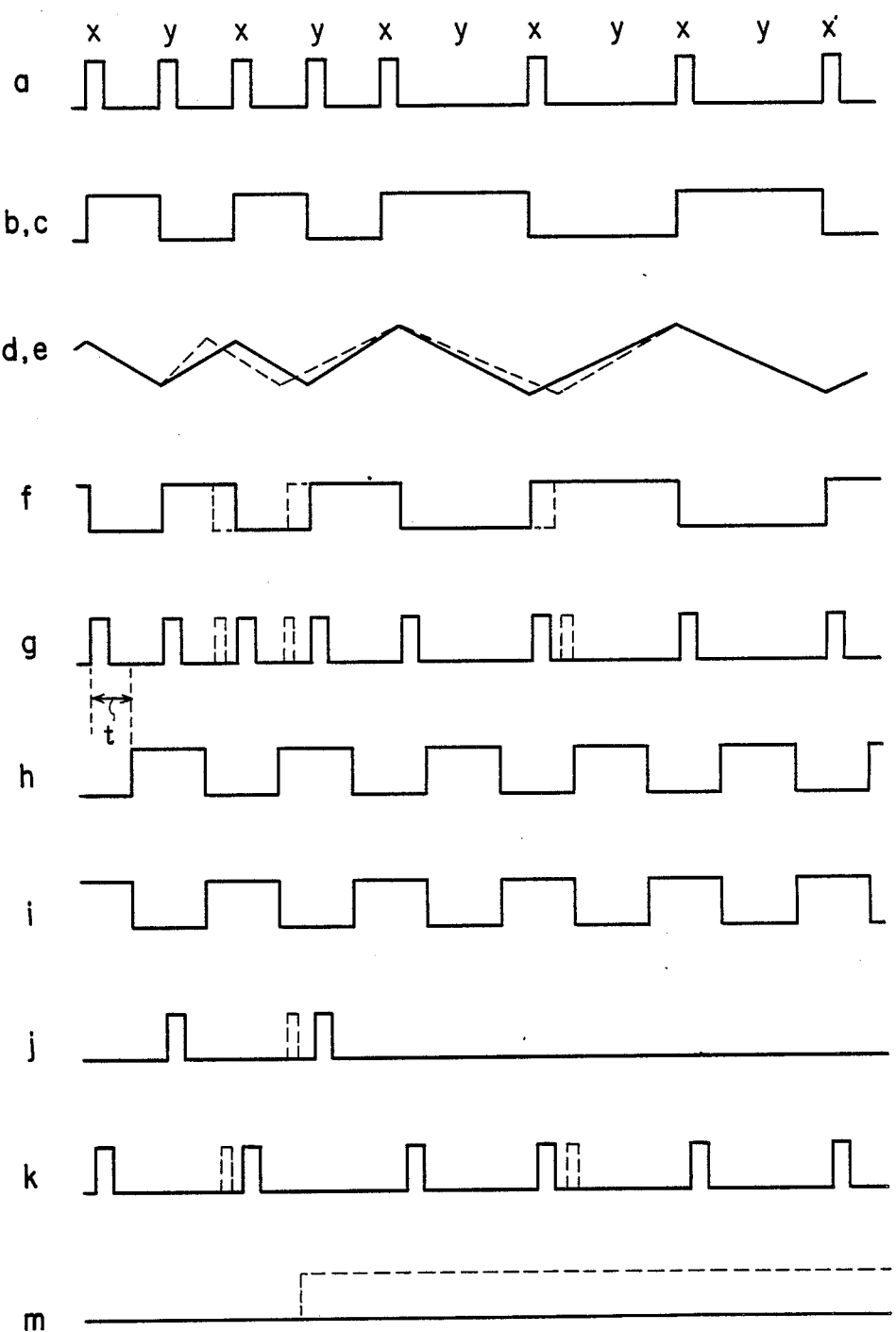

FIG. 5 shows waveforms of signals outputted from the individual circuits in FIG. 4, wherein reference symbols a-k, t, x and y denote those represented by the same symbols in FIG. 3.

Solid lines represent waveforms obtained when the component members such as head 4, disc 3 and so forth function normally. Meanwhile, dotted lines represent waveforms obtained when the floating state of the head 4 is rendered unstable and consequently the head 4 or the disc 3 begins to be damaged or when the head 4, disc 3 or some other electric circuit element begins to malfunction due to gradual deterioration of the performance thereof.

When necessary, the electronic computer transmits an instruction at a prescribed moment to change the delay time t.

In such magnetic disc device, the operation is performed in the following manner. When the head 4, disc 3 and other component members function normally, as shown by solid lines, an output m of the phase margin detection circuit 18 is not produced since the discrimination phase margin of the delay time t from the train of data-clock pulses x, y or the output g of the one-shot circuit 13 to the complementary output h of the VFO circuit 14 is wider than a predetermined value.

However, in case the head 4, disc 3 or any other component member begins to malfunction, as shown by dotted lines, there occurs a phase variation in the train of data-clock pulses x, y or the output g of the one-shot circuit 13, so that the discrimination phase margin of the delay time t from the train of data-clock pulses x, y to the complementary output h of the VFO circuit 14 becomes narrower than the predetermined value of the phase margin detection circuit 18, whereby the output m of the circuit 18 is produced.

As the predetermined value of the phase margin is defined as a variance of the time delay t greater or smaller than the fixed time t by a specified amount, circuit 18 merely measures the parameter t to detect the existence of such a condition. As illustrated in FIG. 5, when an error signal l exists at the time of such condition, circuit 18 will output the signal m.

When the output of the phase margin detection circuit 18 is fed into the electronic computer, the computer immediately transmits an instruction to the magnetic disc device so that, before the head 4 falls on the disc 3 or any component member is damaged due to some other reason, the data is regenerated from the disc 3 and then is stored in another memory unit, thereby preventing accidental erasure of the stored data and executing preventive maintenance to avert a long-time interruption of the work or occurrence of various losses.

In the above embodiment, a VFO circuit is employed for producing a phase-variable gate signal to discriminate the data-clock pulse train. However, a similar effect is also achievable by the use of some other suitable circuit such as a one-shot circuit which produces a variable pulse output.

Furthermore, the delay time of the gate signal defined from the data-clock pulse train to the output of the VFO circuit may be altered to the time from the output of the VFO circuit to the data-clock pulse train, and the duration of the gate signal may be changed as well. In either case, a similar effect is achievable as in the above embodiment.

Although an electric circuit is employed in the above embodiment as the phase margin detection circuit 18, a similar effect is attain by the use of a microcomputer as the circuit 18 controllable by firmware for detecting that the discrimination phase margin has become narrower than a predetermined value. Furthermore, the data-clock pulse train may be the one processed by any suitable modulation/demodulation system other than the above example.

The magnetic disc device described above as an example may be replaced with any other type using magnetic tape, flexible disc or magnetic drum, or with any other memory device such as audio or video recorder of optical, photomagnetic, laser, electric field or electric charge type, and still a similar effect is achievable as in the foregoing embodiment.

The above description is concerned with the case of applying the present invention to a memory unit in a narrow sense. However, the invention is not limited to such example alone and may be applied to any memory unit in a broad sense for use in controller, electronic computer system or software system. And it is possible to achieve an effect similar to that in the foregoing embodiment.

As described in detail hereinabove, the memory unit of the present invention ensures the following advantageous effects.

Due to the arrangement where any error in the regenerated signal is detected in accordance with a second gate signal which is different in waveform from a first gate signal serving to discriminate the regenerated train of data-clock pulses into a data pulse train and a clock pulse train, it becomes possible to previously find any malfunction that results from entrance of dust or various causes as well as deterioration in the performance of the regeneration circuit means and so forth, thereby preventing occurrence of faults.

I claim:

1. A memory unit capable of detecting an error in regenerated data from a memory medium comprising:
   a head (4) disposed opposite to a recording face of a rotatable recording medium (3) and functioning to record and/or regenerate a data-clock pulse train;
   a gate circuit (14) for producing a phase-variable gate signal (h,i);
   a discrimination circuit (15, 16) for discriminating, in accordance with said phase-variable gate signal outputted from said gate circuit, a data-clock train into a data pulse train and a clock pulse train;
   a regeneration error detection circuit (17) for detecting any error in each of said data pulse train and said clock pulse train;
   a phase margin detection circuit (18) for detecting that a discrimination phase margin of said phase-variable gate signal has become narrower than a predetermined value, and being so formed as to produce a detection control signal which enables said head to automatically regenerate the data recorded on said recording medium and further to store the regenerated data automatically in another memory unit.

2. The memory unit as defined in claim 1, wherein said gate circuit is composed of a voltage-controlled variable frequency oscillation (VFO) circuit.

3. The memory unit as defined in claim 1, wherein said discrimination circuit is composed of two AND circuits to discriminate the data-clock pulse train regenerated by said head into a data pulse train and a clock pulse train in accordance with said gate signal of a required duration outputted from said gate circuit.

4. The memory unit as defined in claim 1, wherein said phase margin detection circuit is composed of an integrated circuit controllable by firmware and having a computing function.

* * * * *

UNITED STATES PATENT AND TRADEMARK OFFICE
CERTIFICATE OF CORRECTION

PATENT NO. : 4,937,687

DATED : June 26, 1990

INVENTOR(S) : Masaharu Sengoku

It is certified that error appears in the above-identified patent and that said Letters Patent is hereby corrected as shown below:

On the cover page, at [63] "Continuation" should be --Continuation-in-Part--.

Column 1, line 24, "a" should be --the--.

Column 2, line 14, "l" should be --$\ell$--;
         line 51, "l" should be --$\ell$--.

Column 3, line 33, delete "here";
         same line, delete "a" and substitute --the--;

Column 4, line 7, "l" should be --$\ell$--;

Column 5, line 12, "attain" should be --attainable--.

Signed and Sealed this

Twenty-ninth Day of October, 1991

Attest:

HARRY F. MANBECK, JR.

*Attesting Officer*    *Commissioner of Patents and Trademarks*